US012228025B2

(12) United States Patent
B Zainal Abidin et al.

(10) Patent No.: US 12,228,025 B2
(45) Date of Patent: Feb. 18, 2025

(54) LIQUID RECOVERY SYSTEM

(71) Applicant: PETROLIAM NASIONAL BERHAD (PETRONAS), Kuala Lumpur (MY)

(72) Inventors: Shahrul Azman B Zainal Abidin, Kuala Lumpur (MY); Lukman B A Karim, Kuala Lumpur (MY); Roslan B Hamid, Kuala Lumpur (MY); Arfahsaadah Aripin, Kuala Lumpur (MY); Karthikeyan S, Kuala Lumpur (MY); Zafirah M Ritzaudeen, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 260 days.

(21) Appl. No.: 17/782,837

(22) PCT Filed: Dec. 4, 2020

(86) PCT No.: PCT/MY2020/050194
§ 371 (c)(1),
(2) Date: Jun. 6, 2022

(87) PCT Pub. No.: WO2021/112664
PCT Pub. Date: Jun. 10, 2021

(65) Prior Publication Data
US 2023/0012234 A1    Jan. 12, 2023

(30) Foreign Application Priority Data
Dec. 6, 2019   (MY) .......................... PI 2019007271

(51) Int. Cl.
*E21B 43/34*     (2006.01)
*B01D 5/00*      (2006.01)
(Continued)

(52) U.S. Cl.
CPC ............ *E21B 43/34* (2013.01); *B01D 5/0003* (2013.01); *B01D 5/0087* (2013.01); *B01D 5/009* (2013.01);
(Continued)

(58) Field of Classification Search
CPC ...... B01D 2256/245; B01D 2257/7022; B01D 5/0003; B01D 5/0087; B01D 5/009;
(Continued)

(56) References Cited

U.S. PATENT DOCUMENTS 6,931,889 B1 * 8/2005 Foglietta ................ F25J 3/0655
62/622
9,335,092 B2 * 5/2016 Madison ................ F25J 1/0022
(Continued)

FOREIGN PATENT DOCUMENTS

WO    WO-2014-169384 A1    10/2014

OTHER PUBLICATIONS

International Search Report and Written Opinion of the ISA issued in PCT/MY2020/050194, mailed Apr. 8, 2021; ISA/KR.

*Primary Examiner* — Ellen M McAvoy
*Assistant Examiner* — Chantel Graham
(74) *Attorney, Agent, or Firm* — Harness, Dickey & Pierce, P.L.C.

(57) ABSTRACT

A system for recovering natural gas liquid from a source, comprising: a heat exchanger for cooling wellstream fluid directed therethrough; a first separator for receiving the fluid from the heat exchanger for separating liquid and gas; in a first configuration, the gas from the first separator being directed to a turbo-expander for reducing the temperature and pressure of the gas to form a cold fluid; the cold fluid being directed to a second separator for separating liquid and gas; gas from the second separator being directed to the heat exchanger where it flows therethrough for cooling the well-
(Continued)

stream fluid; wherein if the turbo-expander is not operating, the first configuration may be a changed to a second configuration to bypass the turbo-expander and direct the gas from the second separator to a Joule-Thomson valve to form the cold fluid.

10 Claims, 5 Drawing Sheets

(51) Int. Cl.
  *B01D 53/00*   (2006.01)
  *B01D 53/26*   (2006.01)
  *C10L 3/06*   (2006.01)
  *C10L 3/10*   (2006.01)
  *F25J 3/02*   (2006.01)
  *E21B 41/00*   (2006.01)

(52) U.S. Cl.
  CPC ......... *B01D 5/0093* (2013.01); *B01D 53/002* (2013.01); *B01D 53/26* (2013.01); *C10L 3/06* (2013.01); *C10L 3/106* (2013.01); *F25J 3/0214* (2013.01); *C10L 2290/06* (2013.01); *C10L 2290/08* (2013.01); *C10L 2290/48* (2013.01); *E21B 41/0071* (2013.01)

(58) Field of Classification Search
  CPC .... B01D 5/0093; B01D 53/002; B01D 53/26; C10L 2290/06; C10L 2290/48; C10L 3/06; C10L 3/106; C10L 2290/08; E21B 41/0071; E21B 43/34; F25J 3/0214; C07C 7/09
  See application file for complete search history.

(56) References Cited

U.S. PATENT DOCUMENTS 10,139,157 B2  11/2018  Currence
2019/0225891 A1* 7/2019 Suppiah ............... C10L 3/12

* cited by examiner

LIQUID RECOVERY SYSTEM

CROSS REFERENCE TO RELATED APPLICATIONS

This application is a U.S. National Phase Application under 35 U.S.C. 371 of International Application No. PCT/MY2020/050194 filed on Dec. 4, 2020, which claims the benefit of priority from Malaysian Patent Application No. PI 2019007271, filed Dec. 6, 2019. The entire disclosures of both of the above applications are incorporated herein by reference.

FIELD OF INVENTION

The invention relates to a system for recovering natural gas liquids from hydrocarbon gas streams.

BACKGROUND

Oil production facilities typically lack the infrastructure to deal with hydrocarbon gases, particularly when they are produced at low pressure due to the costs associated with the additional compression facilities for monetizing the gas. Therefore the gas often vented, flared or re-injected back into the well. However, they can be a source of valuable C4+ components which can be recovered as condensates using a liquid recovery system.

In a known liquid recovery system (LRS) a well stream may be routed to a heat exchanger where the fluid is cooled with minimal change of pressure, and then a separator where liquid (C5+) is collected and the gas (C4−) is routed to a turbo-expander which reduces the pressure to cool the gas. The resultant cooled fluid is directed to a low temperature separator where liquid (C5+) is collected, and the cool gas (C4−) is directed to back to the heat exchanger where it can provide the aforementioned cooling effect on the wellstream fluid. The remaining gas can be flared off or reinjected.

However, if the turbo expander stops working, it is possible to provide a Joule-Thompson valve for bypassing the turbo-expander, which reduces the pressure to cool the gas, but not by as much as the turbo-expander. Therefore the system is less effective at recovering condensate in such circumstances.

An aim of the invention therefore is to provide a liquid recovery system which overcomes the above problem.

SUMMARY OF INVENTION

In an aspect of the invention, there is provided a system for recovering natural gas liquid from a source, comprising:
  a heat exchanger for cooling wellstream fluid directed therethrough from a first inlet to a first outlet;
  a first separator for receiving the fluid from the heat exchanger for separating liquid and gas;
  in a first configuration, the gas from the first separator being directed to a turbo-expander for reducing the temperature and pressure of the gas to form a cold fluid;
  the cold fluid being directed to a second separator for separating liquid and gas;
  gas from the second separator being directed to the heat exchanger where it flows therethrough from a second inlet to a second outlet for cooling the fluid flowing between the first inlet and first outlet;
  characterised in that if the turbo-expander is not operating, the first configuration may be a changed to a second configuration to bypass the turbo-expander and direct the gas from the second separator to a Joule-Thomson valve to form the cold fluid.

Advantageously natural gas liquid condensate can be recovered from the wellstream fluid using the turbo-expander to provide a cooling effect, but if the turbo-expander stops working the system can still operate due to the provision of the Joule-Thomson valve which also reduces the pressure of the gas and as a result reduces the temperature thereof.

However in such circumstances the gas from the second separator may not be sufficiently cold enough to effectively cool the fluid flowing between the first inlet and first outlet of the heat exchanger, so alternative cooling means therefor are required.

In one embodiment if the turbo-expander is not operating, the gas from the second separator is directed away from the heat exchanger, and a refrigerant is directed from the second inlet to the second outlet. Advantageously this hybrid refrigeration system, where the cooling effect is partly provided by the JT valve and partly by the refrigerant, is relatively compact compared to a normal onshore refrigeration system, and can thus be used in offshore applications. However a possible issue with this embodiment is that the refrigerant is directed through the same pipes that were used for the gas from the second separator, and therefore there is a potential risk of contamination of the C3− refrigerant by the C4− fluid.

In one embodiment if the turbo-expander is not operating, the fluid from the first outlet of the heat exchanger is directed to a second heat exchanger prior to being directed to the first separator, refrigerant flowing through the second heat exchanger for cooling the fluid from the first heat exchanger. Again this hybrid refrigeration system, where the cooling effect is partly provided by the JT valve and partly by the refrigerant, is relatively compact compared to a normal onshore refrigeration system, and can thus be used in offshore applications. Advantageously the provision of a second heat exchanger allows the refrigerant to flow through separate pipes to the wellstream fluid to avoid the potential contamination of the refrigerant by fluid when shared pipes are used.

In a further embodiment the liquid from the first and/or second separator is used instead of refrigerant in the second heat exchanger. As liquid has a higher heat capacity than gas, this may increase condensate recovery by 50%.

Thus the alternative cooling means comprises:
  i. a refrigerant being directed through the first heat exchanger from the second inlet to the second outlet (instead of the gas from the expansion means);
  ii. a second heat exchanger using refrigerant or cooled liquid from the first and/or second separator as a coolant.

In one embodiment the liquid from the first and/or second separator is directed to a stabiliser column with a side outlet for drawing out liquefied petroleum gas (LPG). The side draw tray location is based on the LPG specification required. Typically the higher the side draw tray location the higher C3 content of the LPG.

In one embodiment the side outlet is slidably mounted. In an alternative embodiment the side outlet comprises a plurality of trays.

In one embodiment the system changes from the second configuration to a third, fourth or fifth configuration when the temperature of the gas from the first separator is not substantially reduced by the turbo-expander or when a threshold temperature is exceeded. Typically the threshold temperature is selected in the range of −25° C. to 10° C., typically 5° C.

In one embodiment the gas from the second outlet of the heat exchanger is directed to one or more additional separators, collected, or flared off.

In one embodiment a dehydration unit is provided upstream of the heat exchanger. Typically the dehydration unit comprises a molecular sieve, hydrate inhibitor, Monoethylene Glycol (MEG), and/or the like.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

DETAILED DESCRIPTION

For the purposes of describing the invention it should be appreciated that the Figures include a plurality of valves (represented as double triangles) to control the configuration of the system, wherein a shaded valve indicates it is closed, whereas a clear valve indicates it is open.

Figure 1:
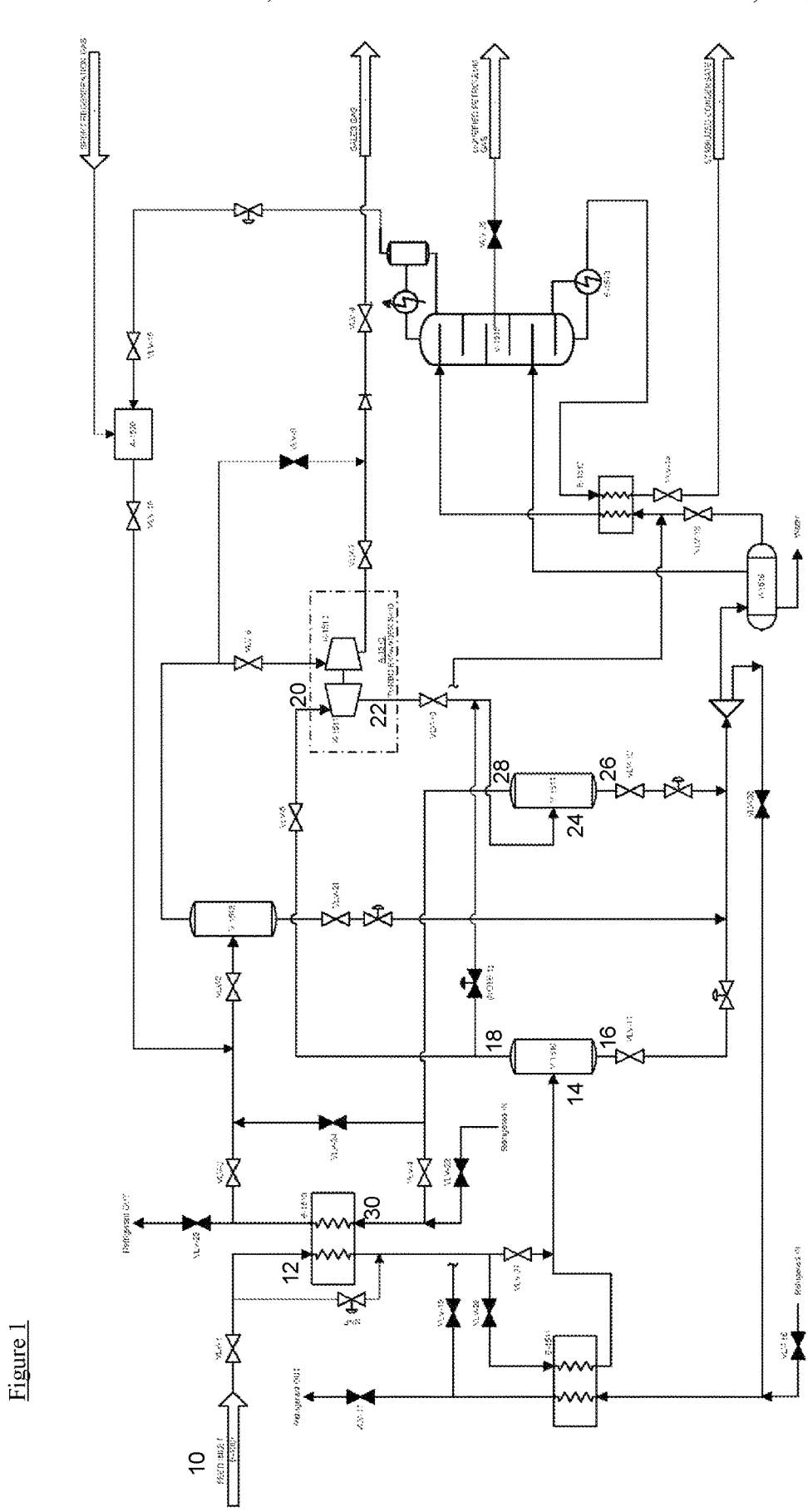
FIG. 1 is a liquid recovery system according to an embodiment of the invention, but operating primarily in a first, known configuration.

FIG. 1 illustrates a liquid recovery system (LRS) which includes some known features as will now be described. In this first configuration the well stream enters the system via feed inlet 10 and is routed to a heat exchanger 12 where the fluid is cooled from 20-30° C. at 40-60 bar to 0-10° C. with minimal change of pressure (perhaps a small drop of around 0.2 bar), and then a separator 14 where liquid (C5+, some C4 & H$_2$O) exits through the lower outlet 16 for subsequent collection. The gas (C4−, some C5+) exits through the upper outlet 18 and is routed to a turbo-expander 20 which cools the gas from 0-10° C. at 40-60 bar to −22−−25° C. at 1-5 bar. The resultant cooled fluid exits from the outlet 22 of the turbo-expander and is directed to a low temperature separator 24 where liquid (C5+, some C4) exits through the lower outlet 26 for subsequent collection, and the cool gas (C4−) is directed from an upper outlet 28 to an inlet 30 of the heat exchanger 12 where it can exert the abovementioned cooling effect on the wellstream fluid. The remaining gas can be flared off or reinjected.

Figure 2:
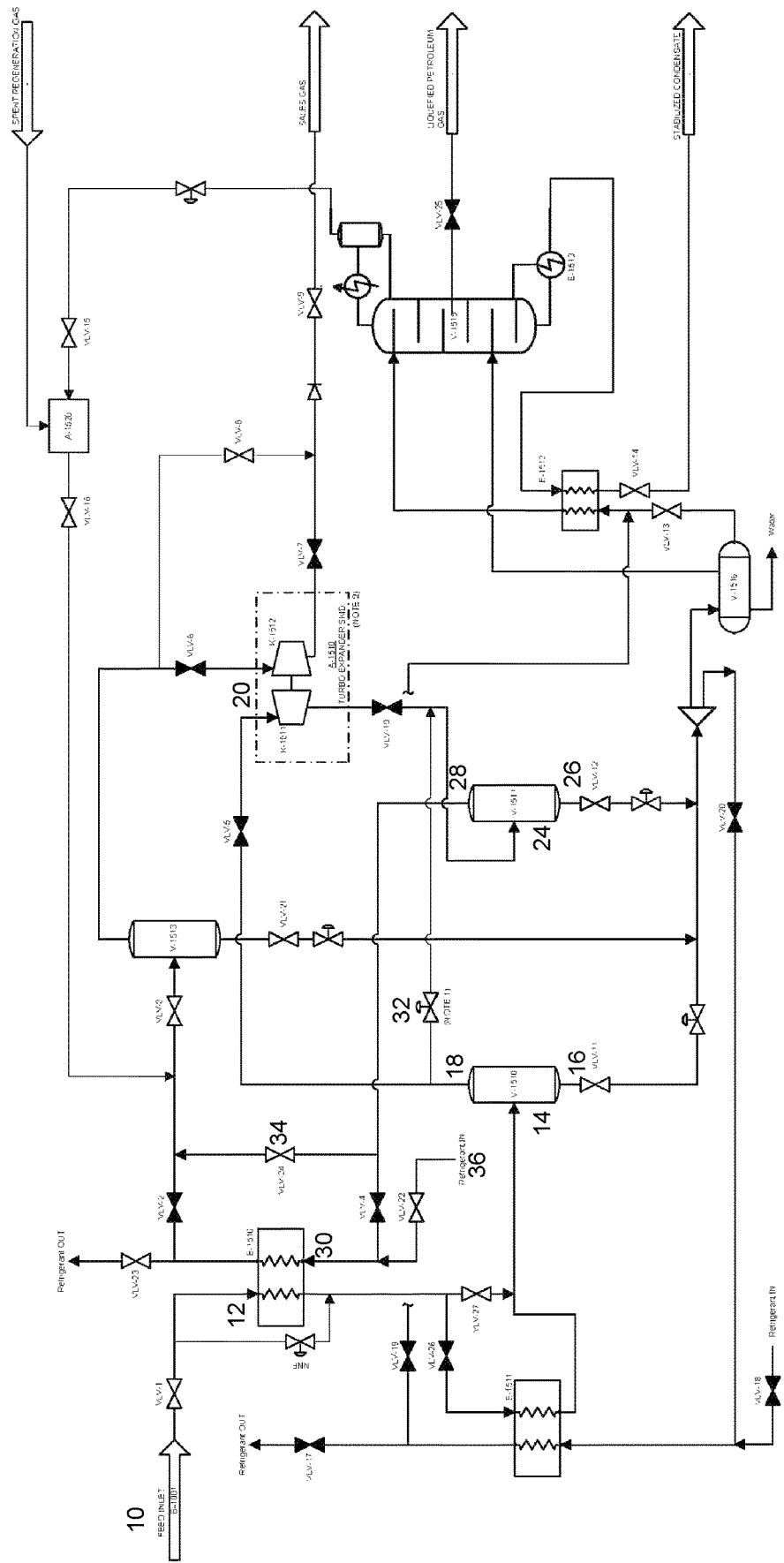
FIG. 2 is a liquid recovery system according to an embodiment of the invention, operating in a third configuration.

With reference to FIG. 2, if the turbo-expander 20 stops working or is offline otherwise (note the closed valves either side thereof), it is possible to change to a second configuration to bypass the turbo-expander via a Joule-Thompson (JT) valve 32, which drops the pressure thereby reducing the temperature of the fluid entering the low temperature separator 24 to −1-2° C. However it will be appreciated that this is less effective than the turbo-expander which reduces the temperature by a further 24° C. or so.

Therefore as the gas from the second separator 28 is not cold enough to exert the required cooling effect in the heat exchanger 12, it is diverted through bypass 34, and a refrigerant 36 at the required temperature of −22−−25° C. is directed through the heat exchanger 12 via inlet 30 instead. This is referred to as the third configuration.

However, a possible issue with the third configuration is that the refrigerant is directed through the same inlet 30 and pipes of the heat exchanger 12 that were used for the gas from the second separator, and therefore there is a potential risk of contamination of the C3− refrigerant by the C4− fluid.

Figure 3:
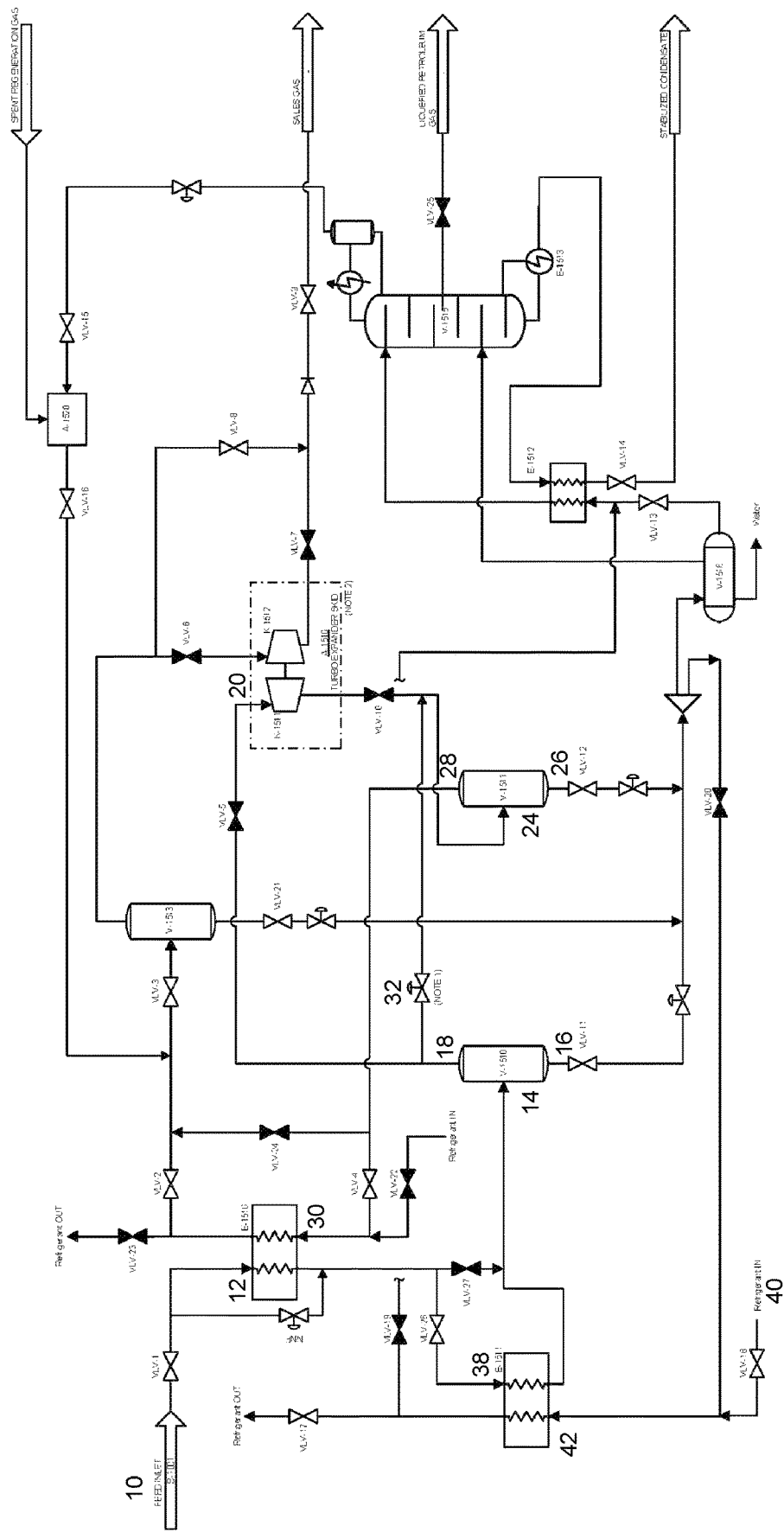
FIG. 3 is a liquid recovery system according to an embodiment of the invention, operating in a fourth configuration.

As such, with reference to FIG. 3, a fourth configuration is provided whereby the fluid from the first outlet of the heat exchanger 12 is directed to an inlet 38 of a second heat exchanger prior to being directed to the first separator 14, refrigerant 40 flowing through the second heat exchanger via a separate inlet 42 for cooling the fluid from the first heat exchanger 12. Advantageously the provision of a second heat exchanger allows the refrigerant to flow through separate pipes to the wellstream fluid to avoid the potential contamination of the refrigerant by fluid when shared pipes are used (as in the third configuration).

Figure 4:
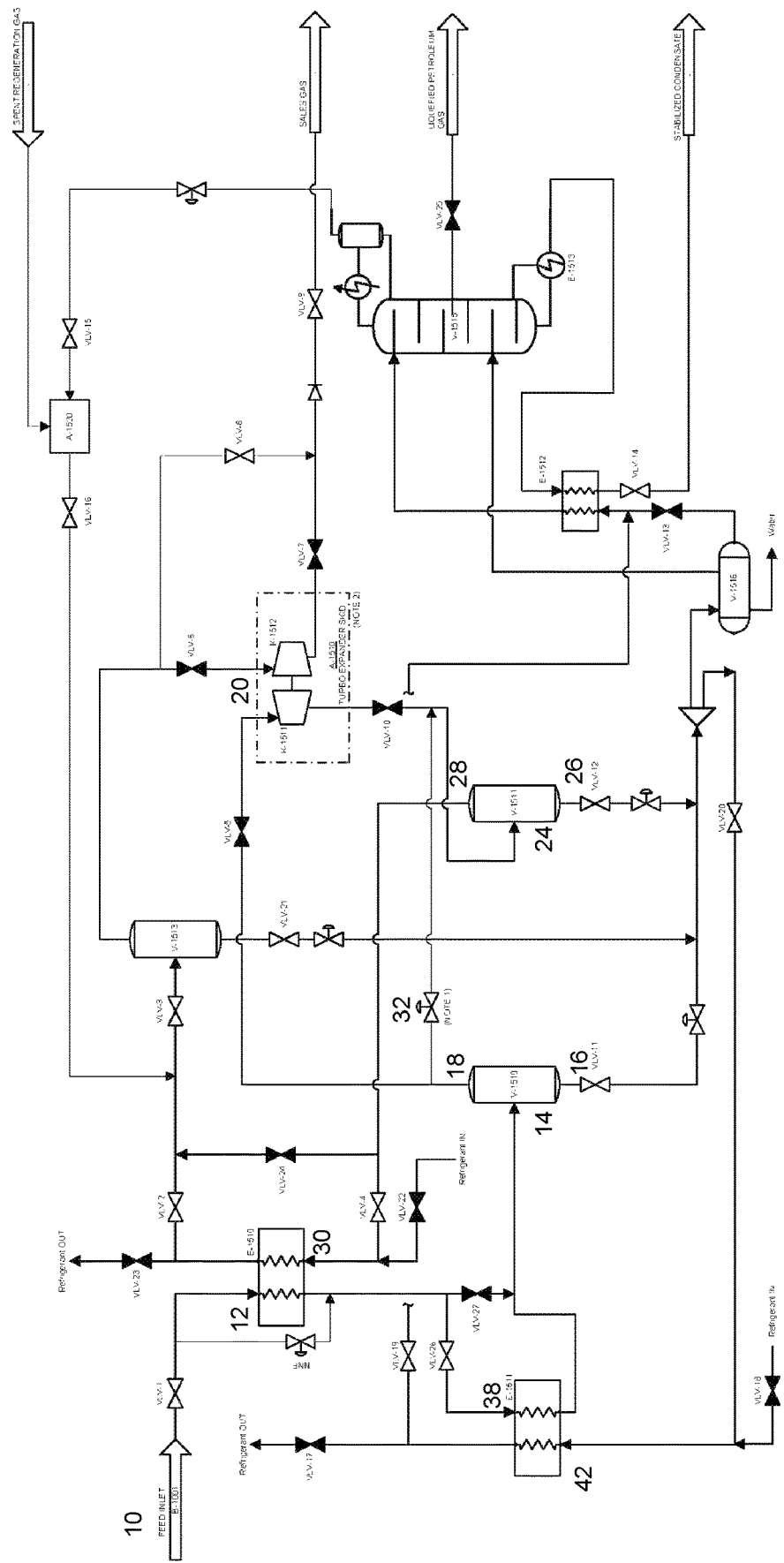
FIG. 4 is a liquid recovery system according to an embodiment of the invention, operating in a fifth configuration.

With reference to FIG. 4, a fifth configuration is provided which is similar to the fourth configuration, but where the liquid from the separators 16, 26 is used as a coolant instead of refrigerant in the second heat exchanger 42. As liquid has a higher heat capacity than gas, this may increase condensate recovery by 50% compared to not using the additional cooling and just relying on the effect from the JT valve 32.

Figure 5:
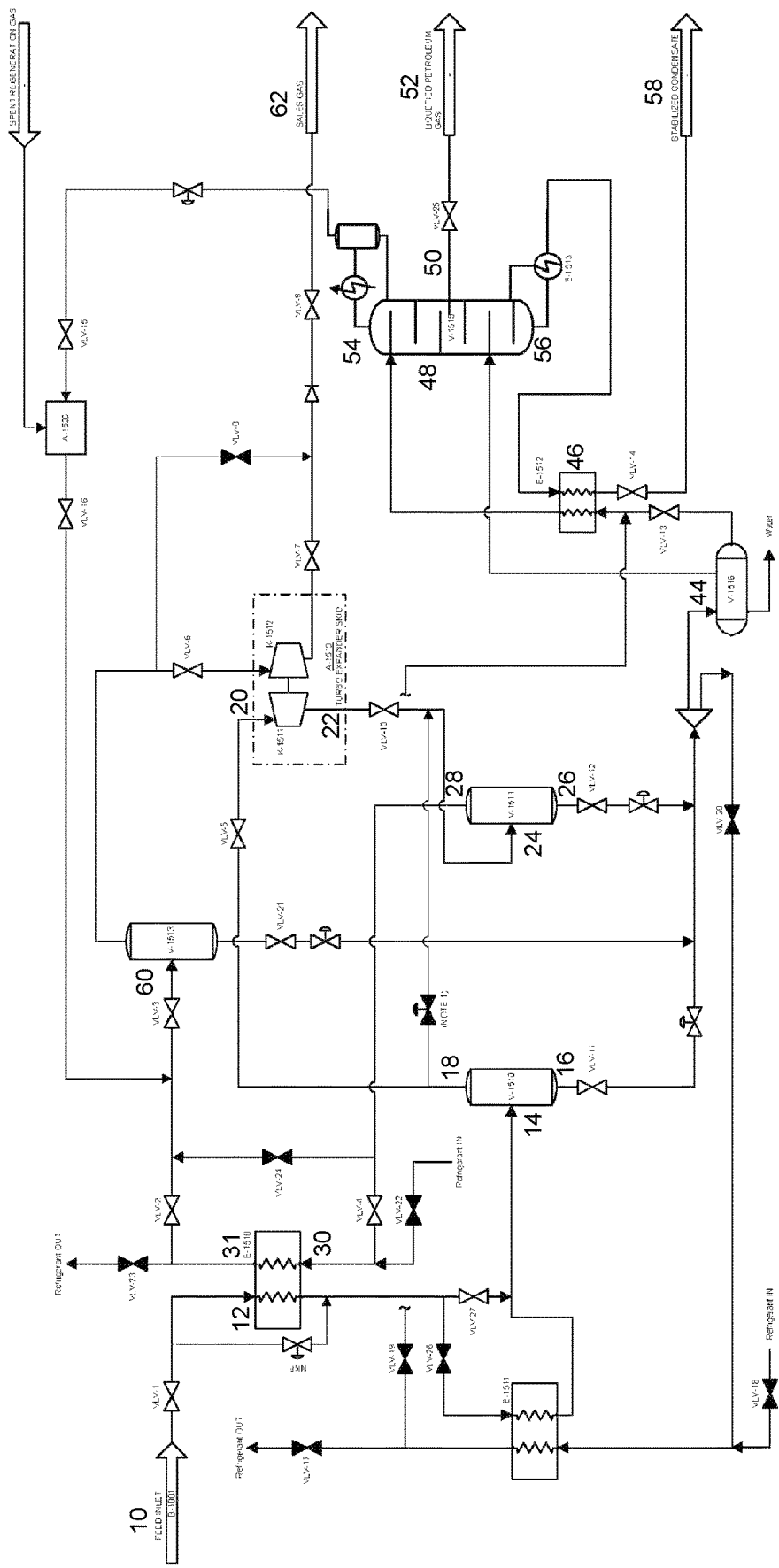
FIG. 5 is a liquid recovery system according to an embodiment of the invention, with further details on the LPG side draw.

With regard to FIG. 5 the liquid from the first and/or second separator is directed, via a further separator 44 and heat exchanger 46, to a stabiliser column 48 with at least one side outlet 50 for drawing out liquified petroleum gas (LPG) 52, with gas exiting through an upper outlet 54, and condensate being collected 58 via a lower outlet 56.

Typically the side outlets for drawing out LPG are in the form of a plurality of trays. The number of trays in the column depends on the feed composition to the distillation column, and there may for example be 45 trays. The location of the LPG side draw is dependent on the LPG specification required, which is closely related to the heating value of the LPG–C4 has a higher heating value compared to C3.

The higher the tray location of the side draw the higher C3 content in the liquid LPG. For example, at tray number 3 the content at 54° C. and 13 barg would be 40% (mol) C3 (Propane) and 60% (mol) the rest mainly C4+. At tray 4 the LPG content at 65° C. and 13 barg would be 30% (mol) C3 (Propane) and 70% (mol) the rest mainly C4+. At tray 5 the LPG content at 74.3° C. and 13 barg would be approximately 20% (mol) C3 (Propane) and 80% (mol) the rest mainly C4+.

Gas from the second outlet 31 of the heat exchanger 12 can be directed to one or more additional separators 60, collected 62, reinjected, or flared off.

It should be appreciated that the components for the third-fifth configurations can be selected as alternatives or in any combination depending on the application requirements.

It will be appreciated by persons skilled in the art that the present invention may also include further additional modifications made to the system which does not affect the overall functioning of the system.

The invention claimed is:

1. A system for recovering natural gas liquid from a source, comprising:
   a heat exchanger for cooling wellstream fluid directed therethrough from a first inlet to a first outlet;
   a first separator for receiving the fluid from the heat exchanger for separating liquid and gas;
   in a first configuration, the gas from the first separator being directed to a turbo-expander for reducing the temperature and pressure of the gas to form a cold fluid;
   the cold fluid being directed to a second separator for separating liquid and gas;
   gas from the second separator being directed to the heat exchanger where it flows therethrough from a second inlet to a second outlet for cooling the fluid flowing between the first inlet and first outlet;
   wherein if the turbo-expander is not operating, the first configuration may be a changed to a second configuration to bypass the turbo-expander and direct the gas from the second separator to a Joule-Thomson valve to form the cold fluid.

2. The system according to claim 1 wherein if the turbo-expander is not operating, the gas from the second separator is directed away from the heat exchanger, and a coolant is directed from the second inlet to the second outlet.

3. The system according to claim 1 wherein if the turbo-expander is not operating, the fluid from the first outlet of the heat exchanger is directed to a second heat exchanger prior to being directed to the first separator, a coolant flowing through the second heat exchanger for cooling the fluid from the first heat exchanger.

4. The system according to claim 2 wherein the coolant is refrigerant from a separate source or cooled liquid from the first and/or second separator.

5. The system according to claim 2 wherein the coolant is utilised if the temperature of the gas from the first separator is not substantially reduced by the turbo-expander or if a threshold temperature is exceeded.

6. The system according to claim 5 wherein the threshold temperature is selected in the range of −25° C. to 10° C.

7. The system according to claim 1 wherein the liquid from the first and/or second separator is directed to a stabiliser column with at least one side outlet for drawing out liquified petroleum gas.

8. The system according to claim 7 wherein the side outlet is slidably mounted or comprises a plurality of trays.

9. The system according to claim 1 wherein the gas from the second outlet of the heat exchanger is directed to one or more additional separators, collected, or flared off.

10. The system according to claim 1 wherein a dehydration unit is provided upstream of the heat exchanger.

* * * * *